US007127721B2

(12) United States Patent
Chaudhuri et al.

(10) Patent No.: US 7,127,721 B2
(45) Date of Patent: Oct. 24, 2006

(54) CORE OBJECT MODEL FOR NETWORK MANAGEMENT CONFIGURATION APPLICATIONS IN TELECOMMUNICATION SYSTEMS

(75) Inventors: Wasim H. Chaudhuri, Bedford, MA (US); Zomana Majid, Bedford, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 809 days.

(21) Appl. No.: 09/942,016

(22) Filed: Aug. 29, 2001

(65) Prior Publication Data

US 2002/0103890 A1   Aug. 1, 2002

Related U.S. Application Data

(60) Provisional application No. 60/264,934, filed on Jan. 30, 2001.

(51) Int. Cl.
*G06F 15/177* (2006.01)

(52) U.S. Cl. ........................... 719/316; 709/223

(58) Field of Classification Search ................ 719/316; 717/108, 116, 120; 709/223–226
See application file for complete search history.

(56) References Cited

U.S. PATENT DOCUMENTS

| | | | | |
|---|---|---|---|---|
| 5,257,371 A | * | 10/1993 | Anezaki | 707/103 R |
| 5,726,979 A | * | 3/1998 | Henderson et al. | 370/254 |
| 5,751,962 A | * | 5/1998 | Fanshier et al. | 709/223 |
| 5,774,689 A | * | 6/1998 | Curtis et al. | 703/21 |
| 5,809,235 A | * | 9/1998 | Sharma et al. | 709/230 |
| 5,845,081 A | * | 12/1998 | Rangarajan et al. | 709/224 |
| 5,872,928 A | * | 2/1999 | Lewis et al. | 709/222 |
| 6,018,625 A | * | 1/2000 | Hayball et al. | 703/22 |
| 6,058,103 A | * | 5/2000 | Henderson et al. | 370/254 |
| 6,061,721 A | * | 5/2000 | Ismael et al. | 709/223 |
| 6,119,171 A | * | 9/2000 | Alkhatib | 709/245 |
| 6,182,153 B1 | * | 1/2001 | Hollberg et al. | 719/315 |
| 6,259,679 B1 | * | 7/2001 | Henderson et al. | 370/254 |
| 6,285,688 B1 | * | 9/2001 | Henderson et al. | 370/516 |
| 6,349,306 B1 | * | 2/2002 | Malik et al. | 707/103 R |
| 6,360,258 B1 | * | 3/2002 | LeBlanc | 709/223 |
| 6,366,657 B1 | * | 4/2002 | Yagel et al. | 379/201.03 |

(Continued)

FOREIGN PATENT DOCUMENTS

EP    0899911 A2  *  3/1999

*Primary Examiner*—Lewis A. Bullock, Jr.
(74) *Attorney, Agent, or Firm*—Matthew J. Hodulik

(57) ABSTRACT

The Core Network Management Object Model of the present invention generically models the physical and logical objects in a configuration management system. The present invention also models the generic action objects required to manipulate the network objects. Unique object level information is isolated at the leaf level of the object model and is not proliferated to other generic parts of the model. The action objects all model different actions that need to be performed in a configuration application architecture and insulates the network objects from having any knowledge of session and event information. Leaf objects and actions are specialized to perform any configuration related actions. In the Core Network Management Object Model an Object Factory creates the unique object and an Action Factory creates the unique action. The action shall then be performed on the unique object to get, set and modify device information through SNMP and also to store the information in the database. This makes the object model for both the network objects and actions re-usable, scalable, and extendable. Use of the present invention drastically reduces development time and effort so that the same objects can be re-used in different applications and solutions.

21 Claims, 3 Drawing Sheets

U.S. PATENT DOCUMENTS

| | | | |
|---|---|---|---|
| 6,675,227 B1 * | 1/2004 | Gavrilo et al. | 719/316 |
| 6,697,856 B1 * | 2/2004 | Hillard et al. | 709/224 |
| 6,804,711 B1 * | 10/2004 | Dugan et al. | 709/223 |
| 6,813,770 B1 * | 11/2004 | Allavarpu et al. | 719/316 |
| 6,996,833 B1 * | 2/2006 | Olson et al. | 719/332 |
| 2001/0056481 A1 * | 12/2001 | Hayball et al. | 709/223 |
| 2002/0035626 A1 * | 3/2002 | Higuchi | 709/223 |
| 2003/0140127 A1 * | 7/2003 | Kaski et al. | 709/220 |

* cited by examiner

THE CORE NETWORK MANAGEMENT OBJECT MODEL IN JAVA WITH LOGICAL PORT (LPORT) AS LEAF ENTITIES

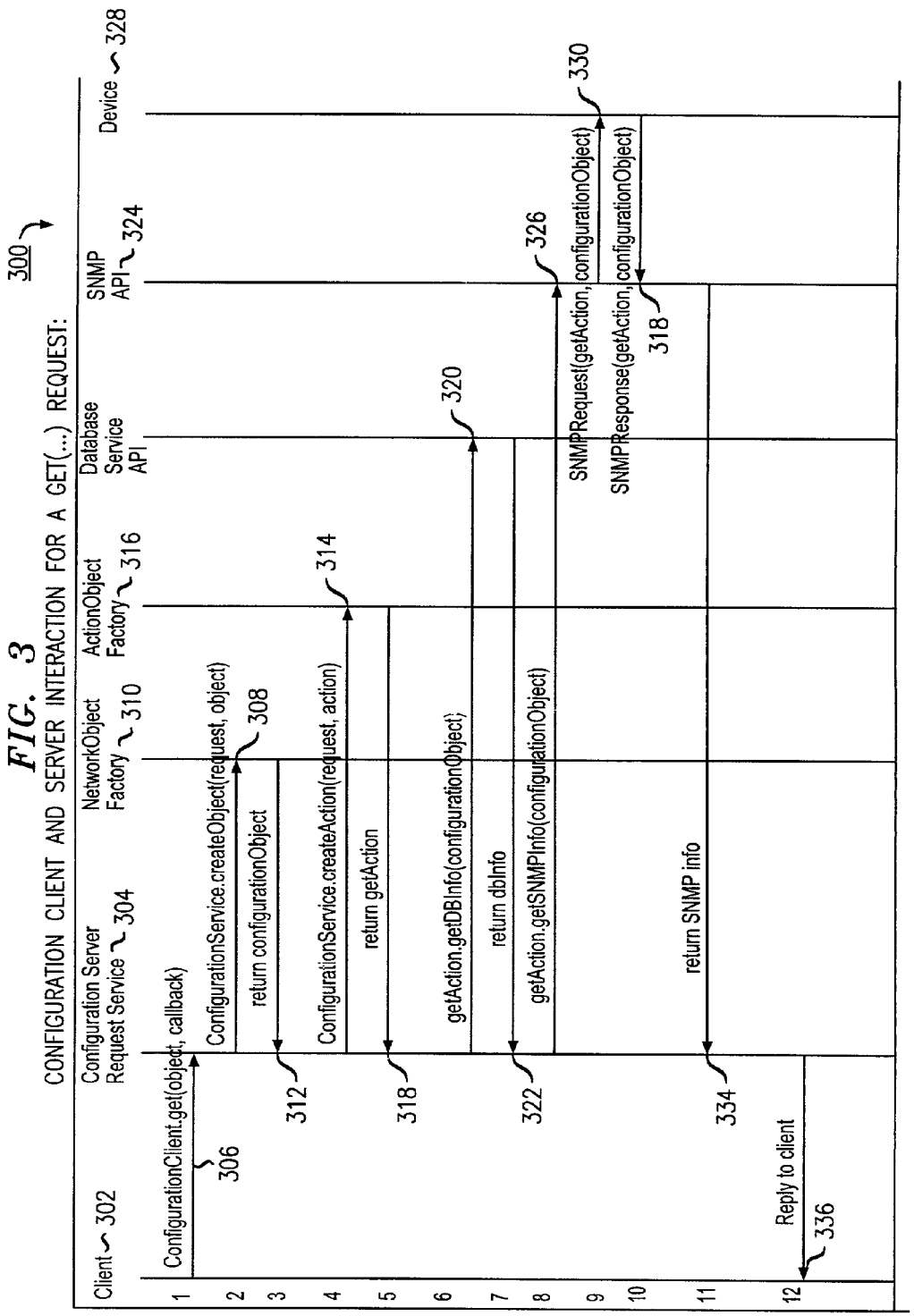

CORE OBJECT MODEL FOR NETWORK MANAGEMENT CONFIGURATION APPLICATIONS IN TELECOMMUNICATION SYSTEMS

CROSS REFERENCE TO RELATED APPLICATION

This application claims priority of Provisional Application Ser. No. 60/264,934 which was filed Jan. 30, 2001.

A Computer Program Listing entitled "Appendix II, Computer Program Listing of Code Samples of Base Classes to Build Network Objects" (the entirety of which is hereby incorporated by reference in full herein as if set forth in full herein), created Jan. 17, 2006, 125 KB in size, and supplied via one compact disc (and one duplicate thereof), is provided as part of the present application.

FIELD OF THE INVENTION

The present invention relates generally to the field of Network Management in Telecommunication Systems, and more specifically to an object model for such a Network Management system.

BACKGROUND OF THE INVENTION

The Network Management Configuration Domain for Telecommunication Systems suffers from not having a generic object model that addresses the issues of modeling telecommunications physical and logical components and devices. Different Network Management vendors have proprietary modeling schemas that reflect object models that are similar to their device structure. These proprietary models, however, are difficult to re-use and extend to build a generic Network Management Configuration object model. The problem of not having a Core Network Management object model that is generic and re-usable translates into having to re-architect the object model multiple times which consumes valuable design and implementation time, energy and cost.

Existing Network Management System (NMS) configuration object models have various shortcomings including not having isolation of business logic in just the specific leaf objects, but rather being proliferated throughout the object model; not distinguishing properly between Network Management Action objects that are required to manipulate specific core objects; and lacking an interaction mechanism to make the objects completely unaware of session and event information. In addition, prior art NMS configuration object models lack abstraction so as to be generically applicable to any network management object model and are not easily re-usable.

Accordingly, a need exists for a generic and re-usable core network management object and action model will solve the above problems.

SUMMARY OF THE INVENTION

The Core Network Management Object Model of the present invention generically models the physical and logical objects in a configuration management system. The present invention also models the generic action objects required to manipulate the network objects. Unique object level information is isolated at the leaf level of the object model and is not proliferated to other generic parts of the model. The action objects all model different actions that need to be performed in a configuration application architecture and insulates the network objects from having any knowledge of session and event information. Leaf objects and actions are specialized to perform any configuration related actions. In the Core Network Management Object Model an Object Factory creates the unique object and an Action Factory creates the unique action. The action shall then be performed on the unique object to get, set and modify device information through SNMP and also to store the information in the database. This makes the object model for both the network objects and actions re-usable, scalable, and extendable. Use of the present invention drastically reduces development time and effort so that the same objects can be re-used in different applications and solutions.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 3 is an exemplary data flow diagram for a specific request in the object model.

DETAILED DESCRIPTION OF THE INVENTION

The present invention is a Core Network Management Object Model that generically models the physical and logical objects of a configuration management system. The invention also models generic action objects required to manipulate the network objects. Unique object level information is isolated at the leaf level of the object model and is not proliferated to other generic parts of the model. Action objects model different actions that need to be performed in a configuration application architecture and insulate the network objects from having any knowledge of session and event information. Leaf objects and actions are specialized to perform any configuration related actions.

In the Core Network Management Object Model of the present invention, an Object Factory creates the unique object and the Action Factory creates the unique action. The action shall then be performed on the unique object to get, set and modify device information through SNMP and also to store the information in the database. This makes the object model for both the network objects and actions re-usable, scalable, and extendable. This drastically reduces development time and effort so that the same objects can be re-used in different applications and solutions.

The Core Network Management Object Model of the present invention can be directly used in implementing most any Network Management application so that the usage of the model is immediate. The reusability feature of the model greatly enhances the cost savings in implementing this object structure. The core object model can translate into significant savings by providing a software object model that simplifies architecture, design and development of any NMS application.

Figure 1:
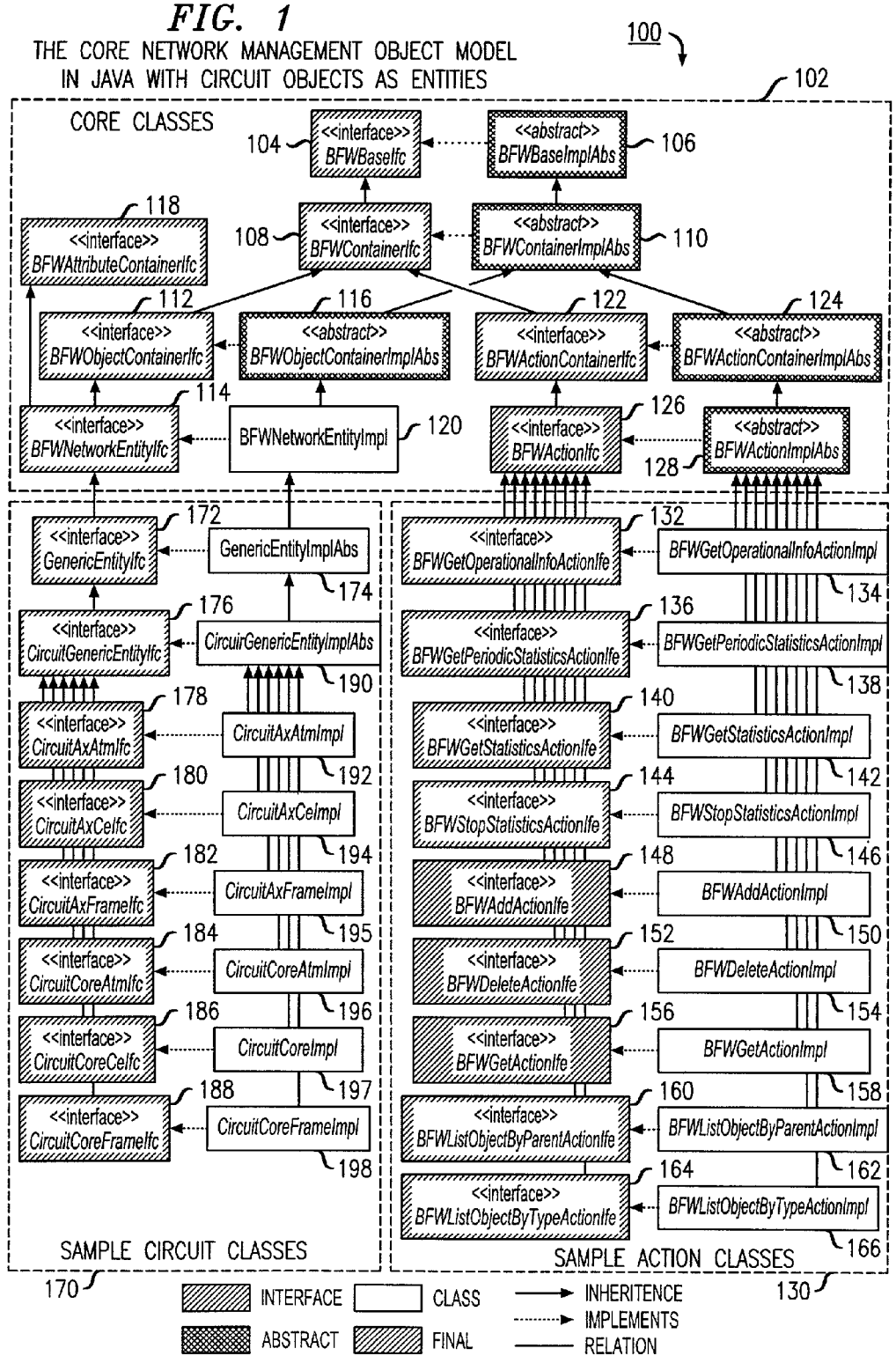
FIG. 1 is an exemplary embodiment of a core network management object model with circuit objects as leaf entities.

Referring generally to FIG. 1, the Core Network Management Object Model architecture of the present invention includes a series of fundamental objects that represent the root of an inheritance tree for Network Management Configuration Applications. The object model can be extended to build a network management configuration object hierarchy. This helps specific developers to build applications by using base classes and interfaces provided in the model instead of defining their own object architecture. The "BFW" pre-fix is used in the object model to denote Base Framework objects. The "Ifc" post-fix is used to denote interface objects. The "Impl" post-fix is used to denote implementation objects.

Figure 2:
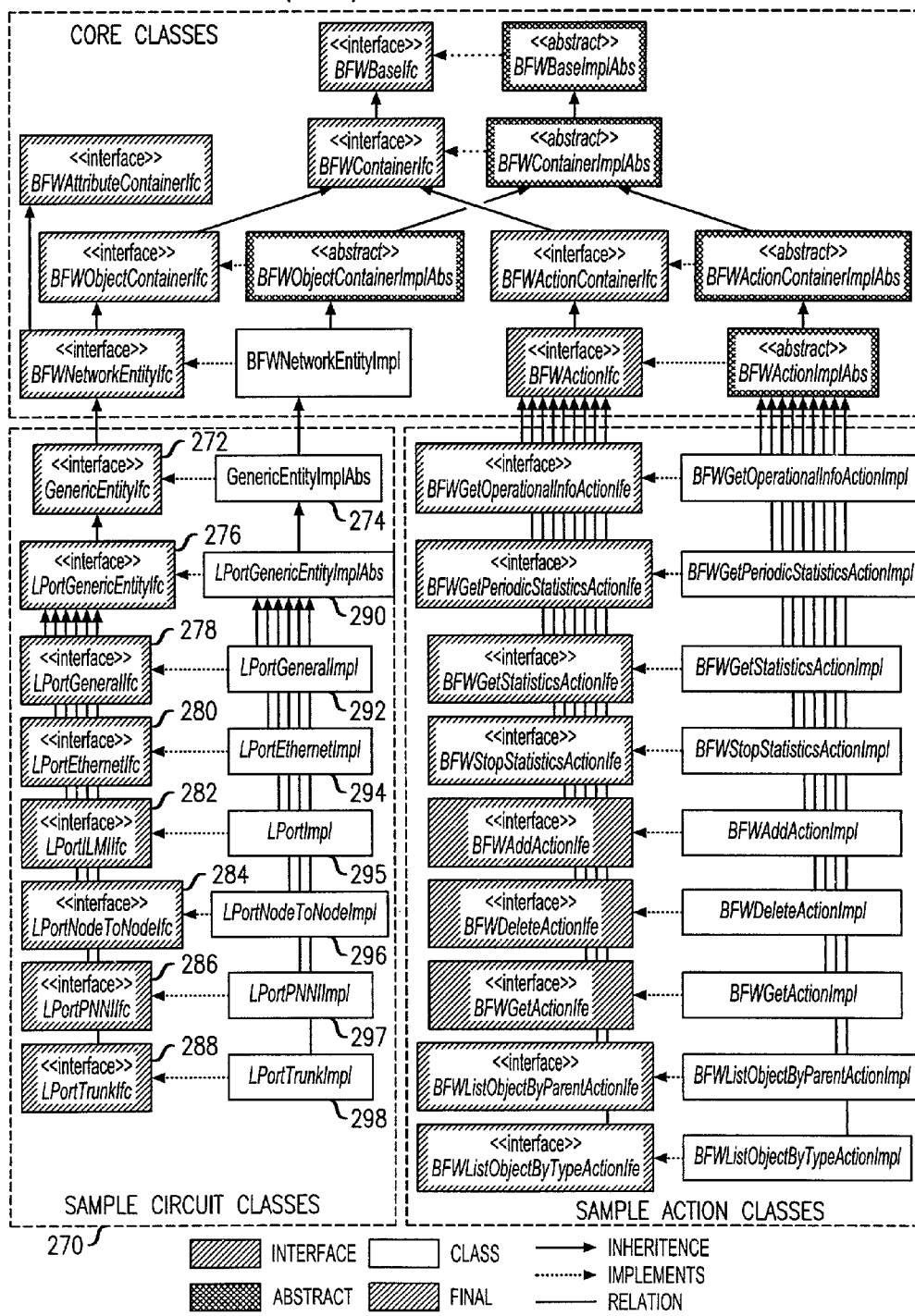
FIG. 2 is an exemplary embodiment of a core network management object model with logical ports as leaf entities.

The object models 100, 200 of FIGS. 1 and 2 are represented and described using nomenclature of the Java programming language. As would be understood by those skilled in the art of computer programming, the object models of the present invention are equally applicable to other similar programming languages. As shown, the object models of the present invention include abstract classes, standard classes and interface objects. As would also be understood, a Class is a way to group data and methods together into one coherent package and an Object is a unique instance of a class. Relations and inheritances (the idea of using one class to create another) between classes and objects are illustrated with unbroken lines and arrows, respectively. Implementations between classes and interface objects, where an interface defines methods that a class implements, are illustrated using broken arrows.

Referring to FIG. 1, a description of the main interfaces and objects in the Core Network Management Object Model 100 follows. Beginning at the top section of the model 100 in the core classes box 102, a BFWBaseIfc interface 104 provides capabilities needed by Core Network Management Objects. These capabilities allow an object to be initialized, uninitialized etc. The BFWBaseImplAbs abstract object 106 implements the BFWBaseIfc interface 104. A BFWContainerIfc interface 108 is inherited from the BFWBaseIfc interface 104. The BFWContainerIfc interface 108 is used in manipulation of contained objects. A BFWContainerImplAbs abstract object 110 shall implement the BFWContainerIfc interface 108.

Proceeding generally downward in the model, a BFWObjectContainerIfc interface 112 defines generic object container methods that are utilized by a BFWNetworkEntityIfc interface 114. The BFWObjectContainerIfc interface 112 supports creation, deletion, access, and naming of entities. The BFWObjectContainerImplAbs object 116 implements the BFWObjectContainerIfc interface 112. The BFWNetworkEntityIfc interface 114 allows dynamic extensions by implementing the BFWAttributeContainerIfc interface 118 and the BFWObjectContainerIfc interface 112. A BFWNetworkEntityImpl object 120 implements the BFWNetworkEntityIfc interface 114. The BFWAttributeContainerIfc interface 118 defines generic attribute container methods that are utilized by the BFWNetworkEntityIfc interface 114.

A BFWActionContainerIfc interface 122 is the base interface for all action objects that are transient in nature and operate on the network objects to perform the task. A BFWActionContainerImplAbs object 124 implements the BFWActionContainerIfc interface 122. Below the BFWActionContainerIfc 122, the BFWActionIfc interface object 126 defines all actions required for network objects in the object model. The BFWActionImplAbs object 128 implements the BFWActionIfc interface 126.

As can be seen, the present invention model also includes a sample grouping of action classes 130. A BFWGetOperationalInfoActionIfc interface object 132 is responsible for getting operational information on network objects. The BFWGetOperationalInfoActionImpl object 134 shall implement the get operational information interface. A BFWGetPeriodicStatisticsActionIfc interface object 136 is responsible for getting periodic statistics information on network objects. The BFWGetPeriodicStatisticsActionImpl object 138 implements the get periodic statistics information interface. A BFWGetStatisticsActionIfc interface object 140 performs single get operations on network objects. The BFWGetStatisticsActionImpl object 142 implements the get statistics information interface.

A BFWStopStatisticsActionIfc interface object 144 performs stop operations on a network object. The BFWStopStatisticsActionImpl object 146 implements the stop statistics interface. A BFWAddActionIfc interface object 148 performs the add action on a network object. The BFWAddActionImpl object 150 implements the add action interface. A BFWDeleteActionIfc interface object 152 performs a delete action on a network object. The BFWDeleteActionImpl object 154 implements the delete action interface. A BFWGetActionIfc interface object 156 performs the get operation on non-statistics attributes on a network object. The BFWGetActionImpl object 158 implements the non-statistics get action interface. A BFWListObjectByParentActionIfc interface 160 object performs the list by parent action on a network object. The BFWListObjectByParentImpl object 162 implements the list by parent action interface. A BFWListObjectByTypeActionIfc interface object 164 performs list by object type action on a network object. The BFWListObjectByTypeActionImpl object 166 implements the list by object action interface.

As can be seen, the BFWActionIfc interface object 126 inherits each of the BFW "Action" interfaces below it. In a similar fashion, the BFWActionImplAbs inherits all of the BFW "Action" implementation objects below. As shown, each of the BFW "Action" interface objects and each of the BFW "Action" implementation objects have a relation to all of the objects which fall underneath a respective object.

The Network Management Object Model of the present invention also includes a sample grouping of Circuit Classes 170. A GenericEntityIfc interface object 172 is the interface object for all generic network entities and is inherited by the BFWNetworkEntityIfc interface object 114. The GenericEntityImplAbs object 174 implements the GenericEntityIfc interface 172. As shown, the following interface objects: CircuitGenericEntityIfc 176, CircuitAxAtmIfc 178, CircuitAxCeIfc 180, CircuitAxFrameIfc 182, CircuitCoreAtmIfc 184, CircuitCoreCeIfc 186, CircuitCoreFrameIfc 188 shall represent all interface objects for different types of sample Circuit objects. CircuitGenericEntityImpl 190, CircuitAxAtmImpl 192, CircuitAxCeImpl 194, CircuitAxFrameImpl 195, CircuitCoreAtmImpl 196, CircuitCoreCeImpl 197, CircuitCoreFrameImpl classes 198 shall represent implementations of the respective Circuit interface objects. The CircuitGenericEntityIfc interface object 176 inherits each of the "Circuit" interfaces below it. In a similar fashion, the CircuitGenericEntityImplAbs 190 inherits all of the "Circuit" implementation objects below. As shown, each of the Circuit interface objects and each of the Circuit implementation objects have a relation to all of the objects which fall underneath a respective object.

Referring to FIG. 2, an exemplary embodiment of the core network management object model 200 of the present invention is shown with logical port (LPorts) connection classes 270 as leaf entities. As shown, the core classes and sample action classes are identical to the embodiment 100 of FIG. 1 (circuit objects). As with the circuit model, a GenericEntityIfc interface object 272 is the interface object for all generic network entities and is inherited by the BFWNetworkEntityIfc interface object 214. The GenericEntityImplAbs object 274 implements the generic network interface. The following interface objects: LportGenericEntityIfc 276, LportGeneralIfc 278, LportEthernetIfc 280, LPortILMIIfc 282, LportNodeToNodeIfc 284, LPortPNNIIfc 286, LportTrunkIfc 288, represent all interfaces objects for the different types of Logical Port objects. LportGenericEntityImpl 290, LportGeneralImpl 292, LportEthernetImpl 294, LPortILMIImpl 295, LportNodeToNodeImpl 296, LPortPNNIImpl 297, LportTrunkImpl 298 classes represent implementations of the respective Logical Port interface objects.

Referring to FIG. 3, a Data Flow Diagram 300 of the Object Model of the present E invention is shown. The overall interaction mechanism between the client 302 and the server 304 is that the client requests information from the server 304 and the server asynchronously creates unique objects and unique actions that will work on the object. The action object then manipulates the network object by getting information from the database and the device itself through SNMP, for example, to build the response for the client. After the construction of the response is complete and the information from the database and the device has been retrieved, the response is pushed back to the client. The exemplary data flow diagram depicts a client requesting get information on a specific object on the server.

As a first step of Client and Server interaction for a get( . . . ) request, a Client provides a request for configuration information in the form of a get request on a specific object by invoking a ConfigurationClient.get(object, callback) request 306. At a next step, the request is serviced by the server 304 at the configuration request service which generates a request createObject( . . . ) 308 to the NetworkObjectFactory 310 to create the unique object e.g. configurationObject of type CircuitAxAtmImpl. At step 312, this unique object called configurationObject is then returned to the Configuration Request Service 304. The Configuration Service 304 then creates a unique action at step 314 by calling the createAction static method on the ActionObjectFactory 316 to create a unique action getAction of type BFW GetActionImpl. The unique action called getAction is then returned to the Configuration Request Service at step 318. The getDBInfo( . . . ) method is then called to get Database information on the object at step 320. At step 322, the database information is returned to the service. The action object is then used to retrieve the SNMP information of the device by calling the SNMP API 324 at step 326. The SNMP API 324 then requests the get information on the specific object from the device 328 at step 330. The SNMP information is returned to the SNMP API 324 at step 332. At step 334, the SNMP information is forwarded to the Configuration Service 304. As a last step 336, the get request information of the configuration object is then returned to the Client 302 requesting this information.

In Appendix I which follows, a detailed description of the interfaces and classes for use in the present invention follows. Appendix II includes exemplary Code samples of base classes to build corresponding network objects.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

Appendix I
Description of the interfaces and classes:

1. BFWBaseIfc

Interface BFWBaseIfc
Abstract interface that shall be supported by all objects to enable objects to be initialized and uninitialized.

Subinterfaces:
    BFWContainerIfc

Implementing Class:
    BFWBaseImplAbs

| Method Summary | |
|---:|---|
| void | initialize()<br>Initialize the state of the object |
| void | uninitialize()<br>Uninitialize and invalidate any handles to the object |

2. BFWBaseImplAbs

Class BFWBaseImplAbs public abstract class BFWBaseImpl implements BFWBaseIfc

Abstract class supported by all objects to enable objects to be initialized and uninitialized.

| Method Summary | |
|---:|---|
| void | initialize()<br>Initialize the state of the object |
| String | initialize()<br>Initialize the state of the object |
| void | uninitialize()<br>Uninitialize and invalidate any handles to the |

|   | object |
|---|--------|

3. BFWContainerIfc public interface BFWContainerIfc extends BFWBaseIfc
    Abstract interface in order to be able to contain entities.
All Subinterfaces:
    BFWActionContainerIfc, BFWObjectContainerIfc

All Implementing Classes:
    BFWContainerImplAbs

| Method Summary | |
|---|---|
| int | getStatus()<br>Returns a status for the object |

4. BFWContainerImplAbs

BFWBaseImplAbs
  |
  + BFWContainerImplAbs public abstract class BFWContainerImplAbs extends BFWBaseImplAbs implements BFWContainerIfc
Abstract class that other classes shall implement in order to be able to contain entities.

Direct Subclasses:
    BFWActionContainerImplAbs, BFWObjectContainerImplAbs

| Method Summary | |
|---|---|
| abstract int | getStatus()<br>Returns a status for the object |

5. BFWObjectContainerIfc public abstract interface BFWObjectContainerIfc extends BFWContainerIfc

Subinterfaces:
    BFWNetworkEntityIfc

Implementing Class:
    BFWObjectContainerImplAbs

| Method Summary | |
|---:|---|
| void | decrementObjectInstanceCount() |
| java.lang.String | getHandle()<br>Return a handle that refers to this entity object. |
| java.lang.String | getIntervalHandle()<br>Return a handle that refers to an interval object. |
| java.lang.Class | getObjectImplClass() |
| int | getObjectInstanceCount() |
| void | incrementObjectInstanceCount() |
| void | setObjectImplClass(java.lang.Class objectClass) |

6. BFWObjectContainerImplAbs

public abstract class BFWObjectContainerImplAbs extends
BFWContainerImplAbs implements BFWObjectContainerIfc
    Base class for all network objects.

Direct Subclasses:
    BFWNetworkEntityImpl

| Method Summary | |
|---:|---|
| protected void | destroy()<br>Delete any objects that are contained by this object |
| String | getHandle()<br>Return a handle that refers to this entity object |
| String | getIntervalHandle() |

|  | Return a handle that refers to this entity object |
|---|---|
| void | initialize()<br>Initialize the state of the object |

7. BFWNetworkEntityIfc public abstract interface BFWNetworkEntityIfc extends BFWObjectContainerIfc, BFWAttributeContainerIfc A BFWNetworkEntity shall allow attribute extensions by implementing the BFWAttributeContainer Interface.

Implementing Classes:
    BFWNetworkEntityImpl

| Method Summary | |
|---:|---|
| void | addAttributeBy(java.lang.Integer attributeKey,<br>                      java.lang.Object attributeToAdd) |
| void | addAttributeBy(java.lang.String attributeKey,<br>                BFWObjectContainerIfc attributeToAdd) |
| void | addAttributeBy(java.lang.String attributeKey,<br>                      java.lang.Object attributeToAdd) |
| boolean | containsAttributeKey(java.lang.Integer attributeKey) |
| boolean | containsAttributeKey(java.lang.String attributeKey) |
| void | decrementObjectInstanceCount() |
| java.lang.Object | getAttributeBy(java.lang.Integer attributeKey) |
| java.lang.Object | getAttributeBy(java.lang.String attributeKey) |
| java.util.Enumeration | getAttributeEntries() |
| BFWHashtable | getAttributeList() |
| int | getObjectInstanceCount() |
| void | incrementObjectInstanceCount() |
| void | removeAttributeBy(java.lang.Integer attributeKey) |
| void | removeAttributeBy(java.lang.String attributeKey) |
| void | replaceAttributeBy(java.lang.Integer attributeKey, |

|  | java.lang.Object attributeToReplaceBy) |
|---|---|
| void | replaceAttributeBy(java.lang.String attributeKey, java.lang.Object attributeToReplaceBy) |
|  |  |

8. BFWAttributeContainerIfc public abstract interface BFWAttributeContainerIfc

| Method Summary | |
|---|---|
| void | addAttributeBy(java.lang.Integer attributeKey, java.lang.Object attributeToAdd) Add atrributes by attributeKey |
| void | addAttributeBy(java.lang.String attributeKey, BFWObjectContainerIfc attributeToAdd) Add atrributes by attributeKey |
| void | addAttributeBy(java.lang.String attributeKey, java.lang.Object attributeToAdd) Add atrributes by attributeKey |
| boolean | containsAttributeKey(java.lang.Integer attributeKey) Check attribute by attributeKey |
| boolean | containsAttributeKey(java.lang.String attributeKey) Check attribute by attributeKey |
| java.util.Map | copyAttributeMap() Copy Attribute Map |
| java.lang.Object | getAttributeBy(java.lang.Integer attributeKey) Get attribute by attributeKey |
| java.lang.Object | getAttributeBy(java.lang.String attributeKey) Get attribute by attributeKey |
| void | removeAttributeBy(java.lang.Integer attributeKey) Remove attributes by attributeKey |
| void | removeAttributeBy(java.lang.String attributeKey) Remove attributes by attributeKey |
| void | replaceAttributeBy(java.lang.Integer attributeKey, java.lang.Object attributeToReplaceBy) |

|  | Replace attribute by attributeKey |
|---:|---|
| void | replaceAttributeBy(java.lang.String attributeKey, java.lang.Object attributeToReplaceBy) Replace attribute by attributeKey |

9. BFWNetworkEntityImpl public class BFWNetworkEntityImpl extends BFWObjectContainerImpl implements BFWNetworkEntityIfc

Shall implement the methods defined in the BFWNetworkEntityIfc interface.

BFWBaseImplAbs
   |
   +--BFWContainerImplAbs
       |
       +--BFWObjectContainerImplAbs
           |
           +--BFWNetworkEntityImpl

| Method Summary | |
|---:|---|
| void | addAttributeBy(java.lang.Integer attributeKey, java.lang.Object attributeToAdd) Add atrributes by attributeKey |
| void | addAttributeBy(java.lang.String attributeKey, BFWObjectContainerIfc attributeToAdd) Add atrributes by attributeKey |
| void | addAttributeBy(java.lang.String attributeKey, java.lang.Object attributeToAdd) Add atrributes by attributeKey |
| boolean | containsAttributeKey(java.lang.Integer attributeKey) Check attribute by attributeKey |
| boolean | containsAttributeKey(java.lang.String attributeKey) Check attribute by attributeKey |
| java.util.Map | copyAttributeMap() Copy Attribute Map |
| java.lang.Object | getAttributeBy(java.lang.Integer attributeKey) |

|  | Get attribute by attributeKey |
| ---: | :--- |
| java.lang.Object | getAttributeBy(java.lang.String attributeKey)<br>Get attribute by attributeKey |
| void | removeAttributeBy(java.lang.Integer attributeKey)<br>Remove attributes by attributeKey |
| void | removeAttributeBy(java.lang.String attributeKey)<br>Remove attributes by attributeKey |
| void | replaceAttributeBy(java.lang.Integer attributeKey, java.lang.Object attributeToReplaceBy)<br>Replace attribute by attributeKey |
| void | replaceAttributeBy(java.lang.String attributeKey, java.lang.Object attributeToReplaceBy)<br>Replace attribute by attributeKey |
| void | setObjectImplClass(java.lang.Class objectClass) |

10. BFWActionContainerIfc public interface BFWActionContainerIfc extends BFWContainerIfc

This is the base interface for objects that are actions and usually not stored in the database.

| Method Summary | |
| ---: | :--- |
| BFWObjectContainerIfc | getOwningEntityRef()<br>Get owning entity reference |
| java.lang.StringBuffer | getTraceData(java.lang.String s)<br>Get Trace Data |
| void | setOwningEntityRef(BFWObjectContainerIfc entity)<br>Set the owning entity reference |
| void | setEqual(BFWActionContainerIfc transientEntity)<br>Sets the state of the Transient equal to the state of the specified source transient. |

11. BFWActionContainerImplAbs public abstract class BFWActionContainerImplAbs extends BFWContainerImpl
implements BFWActionContainerIfc BFWBaseImplAbs
   |
   +-- BFWContainerImplAbs
       |
       +-- BFWActionContainerImplAbs

Direct Subclasses:
       BFWActionImplAbs

| Method Summary | |
|---:|---|
| boolean | equals(java.lang.Object transientToCompare) Compare two transient objects for equal state values |
| BFWObjectContainerIfc | getOwningEntityRef() Get owning entity reference |
| int | getPersistenceStatus() Get Persistence status |
| java.lang.StringBuffer | getTraceData(java.lang.String newLinePrefix) Get trace data |
| boolean | isStateless() Is the object stateless |
| void | setEqual(BFWActionContainerIfc dependent) Set the state of the Transient entity equal to the state of the specified source Transient entity |
| void | setOwningEntityRef(BFWObjectContainerIfc ref) Set owning entity reference |
| int | hashCode() Returns the hash code |

12. BFWActionIfc public interface BFWActionIfc extends BFWActionContainerIfc

Interface class BFWActionIfc defines all actions required for objects

Implementing Class:
BFWActionImplAbs

| Method Summary | |
|---:|---|
| boolean | canDo()<br>Can the action be done. |
| void | doAll()<br>Does all the operations for the action |
| void | doAction()<br>Defines a transaction scope around the doAll() method |
| void | initialize()<br>Initialize the action |
| void | initialize(BFWHandleAbs handle, boolean flag,java.lang.String s, int i)<br>Initialize the action |
| void | setReturnAction(boolean flag)<br>Set the return action |
| void | setState(int i)<br>Set the state of the action |
| void | setTarget(BFWNetworkEntityImpl entity)<br>Sets the target of the action. |

13. BFWActionImplAbs
public abstract class BFWActionImplAbs extends BFWActionContainerImplAbs implements BFWActionIfc

BFWActions encapsulate tasks and other actions that control or modify network objects.

BFWBaseImplAbs
```
 |
 +-- BFWContainerImplAbs
      |
      +-- BFWActionContainerImplAbs
           |
           +-- BFWActionImplAbs
```

| Method Summary | |
|---:|:---|
| protected void | destroy()<br>Destroys the action object |
| void | doBegin()<br>Start the action |
| void | doTransaction()<br>Defines a transaction scope around the doAll() method |
| boolean | equals(BFWActionContainerIfc object)<br>Determines if this object's state is equal to the specified object argument |
| boolean | getReturnAction()<br>Is the return action supported |
| void | handleReset()<br>Handle the reset of the action. |
| int | hashCode()<br>Return hashCode of object |
| void | initialize()<br>Initialize the action |
| void | initialize(BFWHandleAbs newHandle, boolean returnAction, java.lang.String actionLabel, int undoType)<br>Initialize the action |
| void | redo()<br>Redo the action |
| void | reset()<br>Reset the action |
| void | setEqual(BFWActionContainerIfc object)<br>Sets the state of this object to state of another object of the same<br>type |
| void | setReturnAction(boolean returnAction)<br>Set the return action |
| abstract void | setTarget(BFWNetworkEntityImpl entity)<br>Sets the target of the action. |

What is claimed is:

1. A method for providing network management of a telecommunications network that separately implements network objects at a network management system, comprising:
   receiving a request for information from a network device; and
   creating an object model architecture to generate a response to send to the network device, said creation further comprising:
   creating a base framework object container interface and a base framework action container interface from a base framework container interface object;
   creating a base framework network entity interface from said base framework object container interface; and
   creating a base framework action interface from said base framework action container interface, a base framework interface object, a framework container interface object, and said framework object container interface,
   wherein said base framework network entity interface is implemented separately from said base framework action container interface and base framework action interface.

2. The method of claim 1, wherein said base framework network entity interface and base framework network entity implementation objects each inherit corresponding communication connection class objects.

3. The method of claim 2 wherein said connection classes are circuit classes.

4. The method of claim 3 wherein said circuit classes include CircuitGenericEntityIfc, CircuitAxAtmIfc, CircuitAxCeIfc, CircuitAxFrameIfc, CircuitCoreAtmIfc, CircuitCoreCeIfc, CircuitCoreFrameIfc which represent interface objects for different types of sample Circuit objects and CircuitGenericEntityImpl, CircuitAxAtmImpl, CircuitAxCeImpl, CircuitAxFrameImpl, CircuitCoreAtmImpl, CircuitCoreCeImpl, CircuitCoreFrameImpl classes represent implementations of the respective Circuit interface objects.

5. The method of claim 3 wherein said circuit classes are selected from the group consisting of CircuitGenericEntityIfc, CircuitAxAtmIfc, CircuitAxCeIfc, CircuitAxFrameIfc, CircuitCoreAtmIfc, CircuitCoreCeIfc, and CircuitCoreFrameIfc which represent interface objects of different types of Circuit objects.

6. The method of claim 2, wherein said connection classes are logical port classes.

7. The method of claim 6 wherein said logical port classes include LPortGenericEntityIfc, LPortGeneralIfc, LPortEthernetIfc, LPortILMIIfc, LPortNodeToNodeIfc, LPortPNNIIfc, LportTrunkIfc which represent interface objects for the different types of sample Logical Port objects and LPortGenericEntityImpl, LPortGeneralImpl, LPortEthernetImpl, LPortI LMIImpl, LPortNodeToNodeImpl, LPortPNNIImpl, LPortTrunkImpl classes represent implementations of the respective Logical Port interface objects.

8. The method of claim 6 wherein said logical port classes are selected from the group consisting of LPortGenericEntityIfc, LPortGeneralIfc, LPortEthernetIfc, LPortILMIIfc, LPortNodeToNodeIfc, LPortPNNIIfc, LportTrunkIfc which represent interfaces objects of different types of Logical Port objects.

9. The method of claim 1, wherein said base framework action container interface and base framework action implementation abstract objects each inherit corresponding action classes.

10. The method of claim 9 wherein said action classes include a BFWGetOperationalInfoActionIfc, a BFWGetPeriodicStatisticsActionIfc, a BFWGetStatisticsActionIfc, a BFWStopStatisticsActionIfc, a BFWAddActionIfc, a BFWDeleteActionIfc, a BFWGetActionIfc, a BFWListObjectByParentActionIfc, and a BFWListObjectByTypeActionIfc interface object.

11. The method of claim 9 wherein said action classes are selected from the group consisting of BFWGetOperationalInfoActionIfc, a BFWGetPeriodicStatisticsActionIfc, a BFWGetStatisticsActionIfc, a BFWStopStatisticsActionIfc, a BFWAddActionIfc, a BFWDeleteActionIfc, a BFWGetActionIfc, a BFWListObjectByParentActionIfc, and a BFWListObjectByTypeActionIfc interface object.

12. The method of claim 9 wherein said action classes are selected from the group consisting of BFWGetOperationalInfoActionIfc, a BFWGetPeriodicStatisticsActionIfc, a BFWGetStatisticsActionIfc, a BFWStopStatisticsActionIfc, a BFWAddActionIfc, a BFWDeleteActionIfc, a BFWGetActionIfc, a BFWListObjectByParentActionIfc, and a BFWListObjectByTypeActionIfc interface object.

13. The method of claim 1, wherein said network entity interface inherits a base framework attribute container interface.

14. A computer readable medium including software code for providing network management of a telecommunications network that separately implements network objects within a network management system, comprising:
   code for generating a response to a request for information from a network device, including code for creating an object model architecture to generate the response said code further comprising:
   code for creating a base framework object container interface and a base framework action container interface from a base framework container interface object;
   code for creating a base framework network entity interface from said base framework object container interface; and
   code for creating a base framework action interface from said framework action container interface, a framework interface object, a framework container interface object, and said base framework object container interface,
   wherein said base framework network entity interface is implemented in code separately from said base framework action container interface and said base framework action interface.

15. The computer readable medium of claim 14, wherein said network entity interface inherits a base framework attribute container interface.

16. The computer readable medium of claim 14 wherein said connection classes are circuit classes.

17. The computer readable medium of claim 16 wherein said circuit classes are selected from the group consisting of CircuitGenericEntityIfc, CircuitAxAtmIfc, CircuitAxCeIfc, CircuitAxFrameIfc, CircuitCoreAtmIfc, CircuitCoreCeIfc, CircuitCoreFrameIfc which represent interface objects for different types of sample Circuit objects and CircuitGenericEntityImpl, CircuitAxAtmImpl, CircuitAxCeImpl, CircuitAxFrameImpl, CircuitCoreAtmImpl, CircuitCoreCeImpl, CircuitCoreFrameImpl classes represent implementations of the respective Circuit interface objects.

18. The computer readable medium of claim 14, wherein said connection classes are logical port classes.

19. The computer readable medium of claim 18, wherein said logical port classes include LPortGenericEntityIfc, LPortGeneralIfc, LPortEthemetIfc, LPortILMIIfc, LPortNodeToNodeIfc, LPortPNNIIfc, LportTrunkIfc which represent interface objects for the different types of sample Logical Port objects and LPortGenericEntityImpl, LPortGeneralImpl, LPortEthernetImpl, LPortILMIImpl, LPortNodeToNodeImpl, LPortPNNIImpl, LPortTrunkImpl classes represent implementations of the respective Logical Port interface objects.

20. The computer readable medium of claim 14 wherein said action classes are selected from the group consisting of BFWGetOperationalInfoActionIfc, a BFWGetPeriodicStatisticsActionIfc, a BFWGetStatisticsActionIfc, a BFWStopStatisticsActionIfc, a BFWAddActionIfc, a BFWDeleteActionIfc, a BFWGetActionIfc, a BFWListObjectByParentActionIfc, and a BFWListObjectByTypeActionIfc interface object.

21. The computer readable medium as in claim 14 wherein said base framework network entity interface objects and a base framework network entity implementation objects each inherit corresponding communication connection class objects and wherein said base framework action interface and base framework action implementation abstract objects each inherit corresponding action classes.

* * * * *